United States Patent [19]

Aires

[11] Patent Number: 5,319,385
[45] Date of Patent: Jun. 7, 1994

[54] QUADRANT-BASED BINDING OF POINTER DEVICE BUTTONS

[75] Inventor: Fernando P. Aires, Marlboro, Mass.

[73] Assignee: Digital Equipment Corporation, Maynard, Mass.

[21] Appl. No.: 892,189

[22] Filed: Jun. 2, 1992

[51] Int. Cl.$^5$ .............................................. G09G 3/02
[52] U.S. Cl. .................................... 345/156; 345/157
[58] Field of Search ............... 340/706, 709, 712, 710, 340/723; 345/156, 157, 161, 163, 167, 173, 143; 178/18, 19

[56] References Cited

U.S. PATENT DOCUMENTS

| | | | |
|---|---|---|---|
| 4,622,641 | 11/1986 | Stephens | 340/709 |
| 4,686,522 | 8/1987 | Hernandez et al. | 340/709 |
| 4,772,882 | 9/1988 | Mical | 340/710 |
| 4,896,291 | 1/1990 | Gest et al. | 340/703 |
| 4,937,564 | 6/1990 | Oberg | 340/709 |
| 4,984,152 | 1/1991 | Muller | 340/709 |

*Primary Examiner*—Ulysses Weldon
*Assistant Examiner*—Doon Chow
*Attorney, Agent, or Firm*—Fish & Richardson

[57] ABSTRACT

A method for generating input commands to a computer running a program, the computer including a display and a pointer device for controlling a pointer on the display, the pointer device having a button for generating button events, the method including detecting a first button event that occurs at a first location of the pointer; detecting a second button event that occurs at a second location of the pointer; categorizing the second location relative to the first location; and based on said categorization, selecting a command to submit to the program.

18 Claims, 6 Drawing Sheets

FIG. 1
PRIOR ART

FIG. 2A BEFORE

FIG. 2B KEY DOWN

FIG. 2C READY TO KEY UP

FIG. 2D AFTER

FIG. 3B KEY DOWN

FIG. 3D AFTER

FIG. 3A BEFORE

FIG. 3C READY TO KEY UP

QUADRANT-BASED BINDING OF POINTER DEVICE BUTTONS

BACKGROUND OF THE INVENTION

Most modern computers have both a keyboard and a mouse (or other pointer device, such as a trackball, puck, tablet, or spaceball) as input devices. A user of the computer uses the mouse to drag a pointer or cursor on the computer's display. A mouse has one or more buttons; these buttons typically send a signal to the computer when clicked, and this signal is presented to a program running on the computer. Some computers present a "click" to the program when a button is pressed (downclicked) and when released (upclicked), and some only present a signal on one of a down- or upclick. The click signal, sometimes called a button event, passed to the program typically incorporates the current position of the pointer.

Most software that accepts mouse input allows the programmer or user to use a mouse button to issue a command to the software. Besides the obvious advantages of a mouse in positioning the pointer, mouse-based interfaces substantially speed up data manipulation compared to keyboard-based interfaces. The advantages of making commands available through mouse buttons include:

The user's hand can stay on the mouse. Moving a hand from arrow keys to alpha keyboard or mouse to keyboard takes time.

Similarly, the user's eyes and attention can stay focused on his work, instead of having to search the keyboard for the proper menu item and key, then return to search the screen for his point of interest.

The mouse only has a few buttons. It is easy to remember which button executes which command, and the correct button can be found by touch.

One of the major virtues of a mouse, the limited number of buttons, can also be a major limitation: typically only a few commands are bound to mouse buttons. In a complex software system, such as a very large scale integrated circuit (VLSI) design system, there are typically a few commands —but often more than three —that are used extensively and that the user should have easy access to.

The most straightforward technique for binding commands to buttons is "one button—one command:" in any particular program context, any button performs one and only one function.

One way to extend the number of commands available through the buttons is pop-up and slide-off menus. When the user clicks a button, a menu pops up on the screen. The user drags the mouse to position the pointer on the desired command. Some menu items have slide-off submenus —by dragging the mouse off the right side of a menu bar, another submenu pops up. Finally, at the next button event (either an upclick or a second full down/up click), the selected command is issued.

When a small number of commands are to be executed repeatedly, it's desirable to bind them directly to mouse buttons, so that clicking the button immediately executes the command, eliminating the time to search for and position the pointer on a menu item. In one known approach, the screen is divided into a work area and a command menu. The user drags the pointer onto the command menu and clicks a button. Rather than issuing the command, this click binds the selected command to that button. The command will be issued whenever that button is clicked in the work area, until the button is clicked on another command of the menu.

A prior technique for simultaneously binding a plurality of commands to each mouse button is the "stroke recognition" method. One implementation of stroke recognition uses a matrix whose cells are numbered 1 to 9:

| 7 | 8 | 9 |
|---|---|---|
| 4 | 5 | 6 |
| 1 | 2 | 3 |

The user binds a command to a number sequence. One button of the mouse is dedicated to strokes; the other buttons of the mouse may remain bound to single commands or to pop-up menus, for instance. When the user downclicks the stroke button, the stroke recognizer begins to track the motions of the mouse. When the button upclicks, those motions are mapped to the cells of the matrix and classified into a stroke. For example, in a hypothetical example, the sequence "7895123" (forming the letter "Z") zooms on the region where the user traced the "Z". The user can then zoom to a drawing area by downclicking the stroke mouse button, drawing a "Z" pattern over the area of interest, and then upclicking. The stroke "7895123" is distinguished from "3215987."

SUMMARY OF THE INVENTION

Quadrant-based binding of pointer device buttons provides a faster, easier and more powerful means for interactive computer users to enter and manipulate data, by allowing multiple commands to be bound to the buttons of a mouse or other pointer device.

In general, in one aspect, the invention features a method by which a mouse (or other pointer device) is used to generate input commands to a computer program. In the method, the user generates a mouse button event at a screen position, then optionally drags the mouse, and generates a second button event. The software implementing the method classifies the position of the second button event relative to the first, and based on that classification, submits a command to the program.

Embodiments of the invention may feature the following. The space around the position of the first button event is partitioned into four quadrants, and the position of the second button event is classified into one of the four quadrants. If the two button events are within a tolerance distance of each other, a different command is generated. This tolerance distance may be specified by the user. When the first and second positions describe the opposite corners of a box on the screen, the box is passed to the program as the region on which the generated command is to act. The first button event is a downclick of a button, and the second button event is an upclick of that button. Button events generated by different buttons generate different commands. By using "second function" keys, many commands are bound to a single quadrant of a single button.

Quadrant-based binding has the following advantages. The action that selects a figure or area of the screen and the action that invokes the command are unified into a single motion, potentially cutting by two-thirds the time taken to select an object and issue a command to it. The motion is a single sweep, rather than a multiple-segment figure that must be executed with some precision on the part of the user. Because the difference between a "northwest" sweep and a "northeast" sweep is unambiguous, command recognition is unambiguous. The user does not have to take the time to search for a menu command or key to invoke the command, nor the time to refocus his attention on his work. Quadrant recognition is easy for users to learn. Implementation of quadrant recognition requires capturing and comparing the position of only two points, rather than sampling the mouse's position at possibly hundreds of intermediate points, and then analyzing the path.

Other features and advantages of the invention will be apparent from the following description of preferred embodiments, and from the claims.

DESCRIPTION

Figure 1:
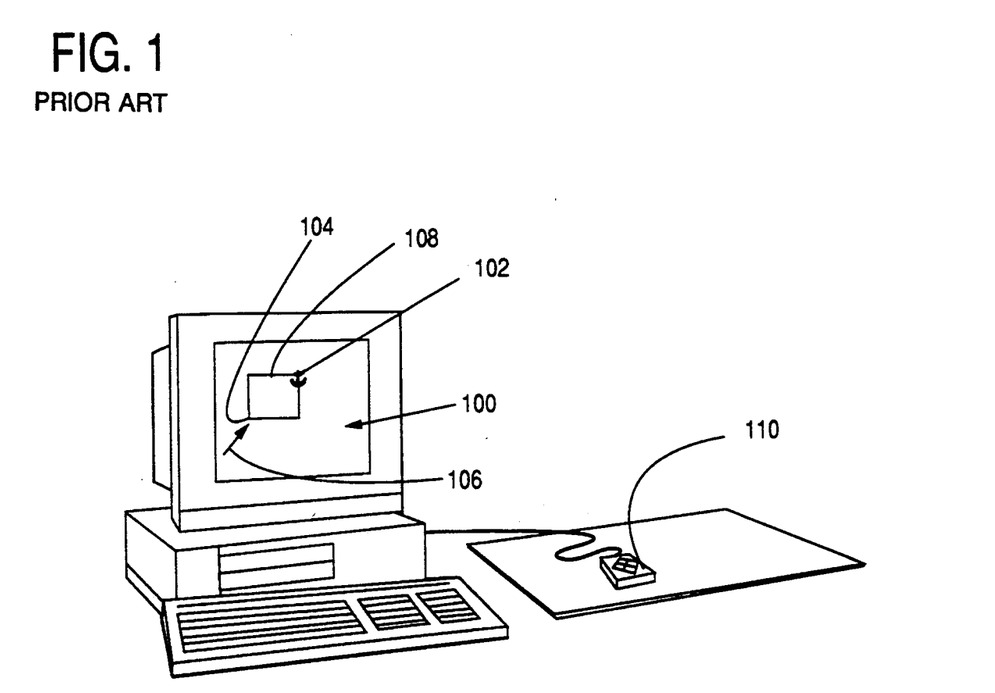
FIG. 1 shows a desktop computer with a bitmapped graphics display device and a puck.

Referring to FIG. 1, a bitmapped graphics display 100 has locations specified by (x,y) coordinates. A pointer indicates a position on the screen; this pointer can be dragged by a puck device 110. The puck has four buttons, in this case yellow, white, blue, and green. The screen shows that the user has downclicked one of the buttons at a point, and the computer has responded by marking this point with an anchor 102. The user has then dragged the puck 110 southwest to point 104; the computer continuously indicates the position of the pointer with an arrow 106 and continuously redraws the box 108 specified by the original anchor point 102 and the current pointer location 104. When the user upclicks, the two (x,y) points specified by the downclick and the upclick specify a box.

The invention is operated in two phases. In the binding phase, the user specifies the binding of commands to button clicks and motions. In the use phase, mouse (or other pointer device) clicks and motions are interpreted as commands to a program.

FIGS. 2a–d and 3a–d demonstrate the use phase of the invention. Each of the eight figures shows a screen configuration with a grid of figures. FIGS. 2a–3d show the invention being used to zoom in on the figures, and FIGS. 3a–d show the invention used to zoom out.

Figure 2A:
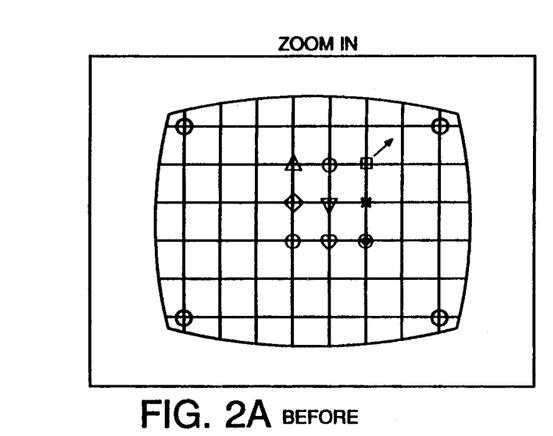
FIGS. 2a–d are a time sequence of screen images of the invention being used to zoom in on a part of the screen.
Figure 2B:
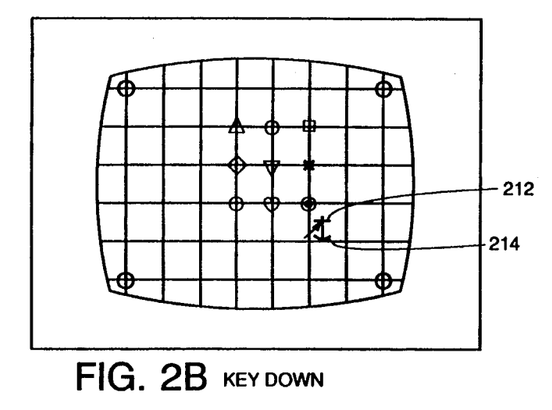
Figure 2C:
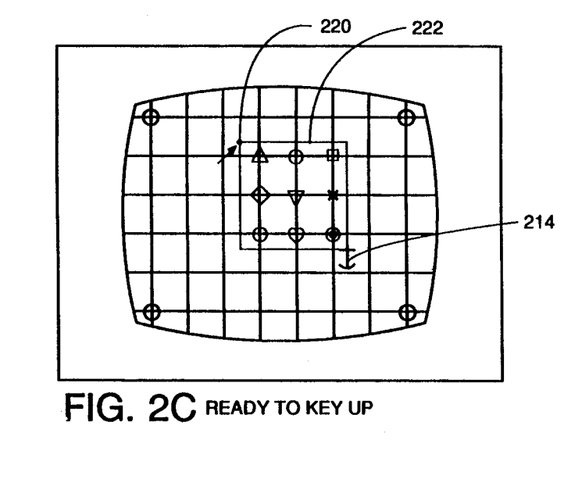
Figure 2D:
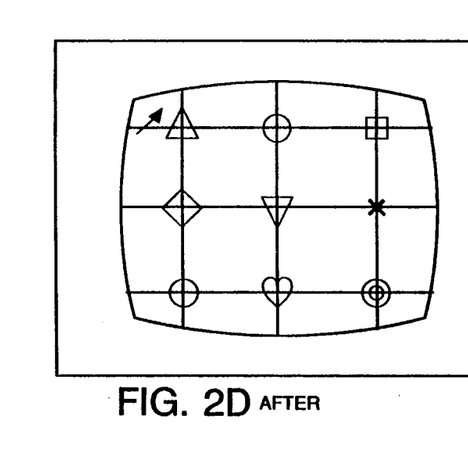

In FIG. 2a, a "before" view of a design layout screen is presented. In FIG. 2b, the user has dragged the pointer to the southeast corner 212 of a region of interest, and downclicked the mouse button bound to a group of VIEWING commands. The computer has responded by drawing an anchor symbol 214. In FIG. 2c, the user has dragged the pointer to the northwest corner 220 while holding the button down; the computer has responded by drawing a box 222 around the region. In FIG. 2d, the user has released the button. The start point 212 and endpoint 220 define the opposite corners of a box; because this box was drawn southeast-to-northwest (or simply "northwest"), the computer interprets the motion as a command to zoom in on the boxed area. The figures of the boxed area of FIG. 2c now fill the screen of FIG. 2d; the effect of the command has been to zoom in on the original screen of FIG. 2a.

Figure 3A:
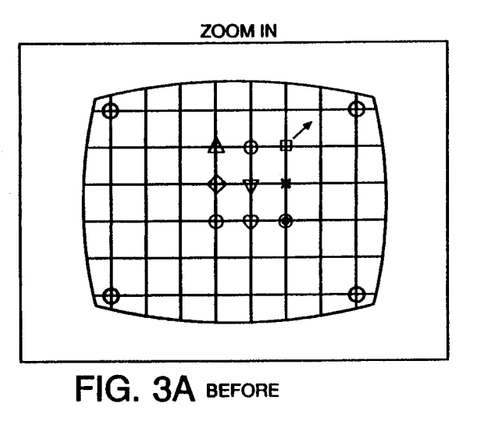
FIGS. 3a–d are a time sequence of screen images of the invention being used to zoom out.
Figure 3B:
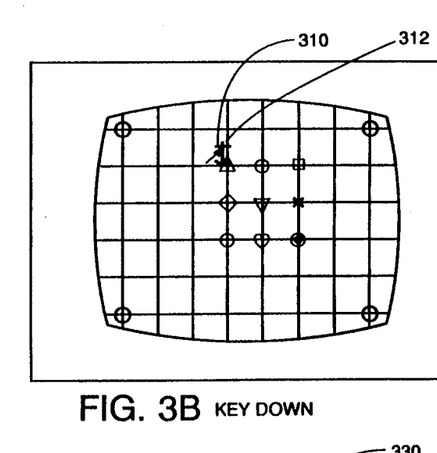
Figure 3C:
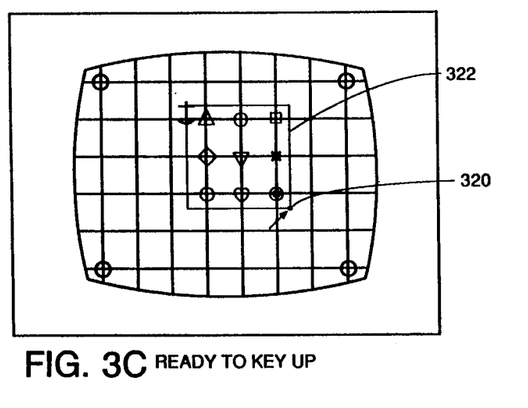
Figure 3D:
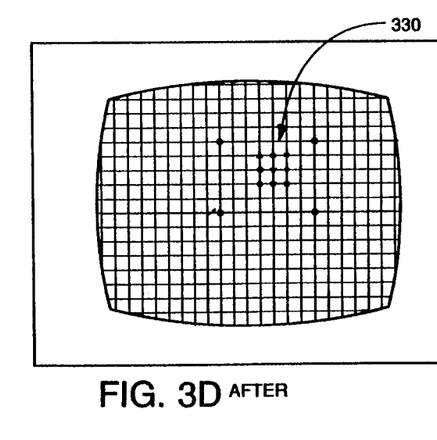

FIG. 3a presents the same "before" view as FIG. 2a. In FIG. 3b, the user has dragged the pointer to the northwest corner 310 of a box, and downclicked the same VIEWING button. In FIG. 3c, the user has dragged the pointer to the southeast corner 320 while holding the button down; the computer has responded by drawing a box 322 around the region. In FIG. 3d, the user has released the button. Because the box was drawn northwest-to-southeast (or simply "southeast"), the computer interprets the motion as a command to zoom out. The figures of the original screen of 4a have been shrunk to fill the boxed area 330; the effect of the command has been to zoom out from the original screen of FIG. 3a.

Note that in the two examples, the box covered exactly the same region, and the user clicked the same button. The only difference was the direction in which the box was drawn.

There are four box commands available for every button, one for each quadrant. An additional command per button is bound to points (where the user downclicks and then upclicks at the same point). The user is allowed to specify a tolerance value for the size of the neighborhood around a "point." For instance, if the user drags the mouse no more than two pixels vertically or two pixels horizontally, the point command is issued rather than a box command. In the present embodiment, the tolerance is specified in CDU's, CMOS drawing units, units of measure correlated to the minimum feature size of the semiconductor technology.

The number of commands bound to buttons can be further increased through second function keys, much as shift and control keys of standard keyboards provide different characters from the same keypresses. The PF2 key (one of the row of function keys across the top of a computer keyboard) serves this purpose: pressing PF2 and then drawing a box issues a different command than drawing the box alone.

Sometimes a user downclicks by mistake or changes his mind, and wants to cancel without issuing a command. He accomplishes this by sliding the pointer outside the work area of the screen before upclicking.

The present embodiment runs as a software shell around a set of VLSI layout tools.

Figure 4:
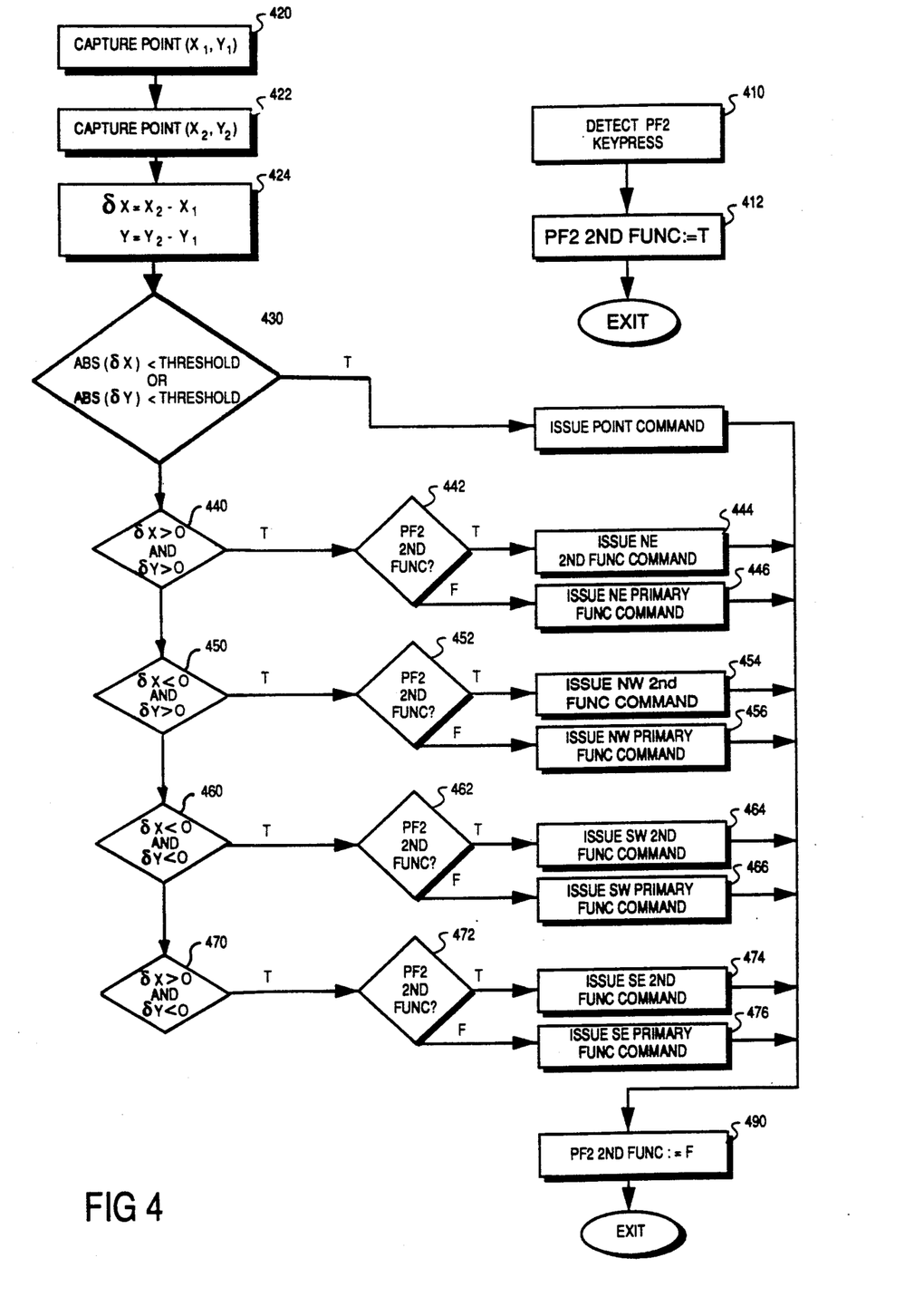
FIG. 4 is a flowchart of an embodiment of the invention.

Referring to FIG. 4, the shell watches for two kinds of events: pressing a second function key, or a mouse downclick. The shell monitors for a PF2 keypress (step 410); when a PF2 keypress is detected, the shell sets a global variable to record the event (step 412). When the user downclicks a mouse button, the software shell detects the downclick and records the (x,y) pointer position of this downclick event (step 420) in a variable. The user may then drag the mouse, and upclick to select a command. The software shell detects the upclick and records the (x,y) position of the upclick (step 422).

Once the button upclicks, the shell determines which macro was bound to that button, and invokes the macro. The shell computes the difference between the upclick and the downclick x coordinates, $\Delta x$, and the difference between the upclick and downclick y coordinates, $\Delta y$, and saves their values (step 424). The shell then classifies the value of $(\Delta x, \Delta y)$ into a point or quadrant, qualifies this classification with a second function, and issues a command. The classification begins with a check for "within tolerance of zero" values of either Δx or Δy (step 430). If either Δx or Δy are less then a specified threshold, the shell treats the user's input as a single point (step 432) and issues the appropriate point command. If the check for "point specification" returns false, the shell classifies (Δx,Δy) by quadrant. The shell first checks for both Δx and Δy positive, the northeast quadrant (step 440). If this test succeeds, then the shell tests the PF2 global variable (step 442), and based on this test issues either the "northeast primary" (step 444) or the "northeast second function" command (step 446). If the northeast quadrant test fails, the shell performs the analogous actions to check the signs of each of Δx and Δy to determine in which quadrant (Δx,Δy) lies (steps 450, 460, 470), test the PF2 global variable to see if the second function key was pressed (steps 452, 462, and 472), and issue the command that the user has bound to that point/quadrant/second function combination (steps 454, 456, 464, 466, 474, 476). After the command is issued the software shell resets the values of the second function global variable (step 490).

If the user presses PF2 by mistake and wants the primary command, in the present embodiment he must escape to a "back door" method of resetting the PF2 global variable. If PF2 is pressed after the downclick, the upclick will generate the primary command for the quadrant; the following quadrant command will consume the PF2 modifier.

The software shell works with a three-button mouse, four-button puck, or pen-and-tablet device. It recognizes four quadrants and points, and has one second function key, yielding a maximum of thirty commands for the mouse or forty for the puck.

The command executed may or may not make use of the two corner coordinates that defined the area traced. Certain editing commands such as "ZOOM DOWN TO AN AREA" require as input two (x,y) coordinate pairs, but other commands such as "VIEW ALL DATA IN DRAWING" do not.

The user prepares the software by binding commands to clicks and motions by a process described below.

Figure 5:
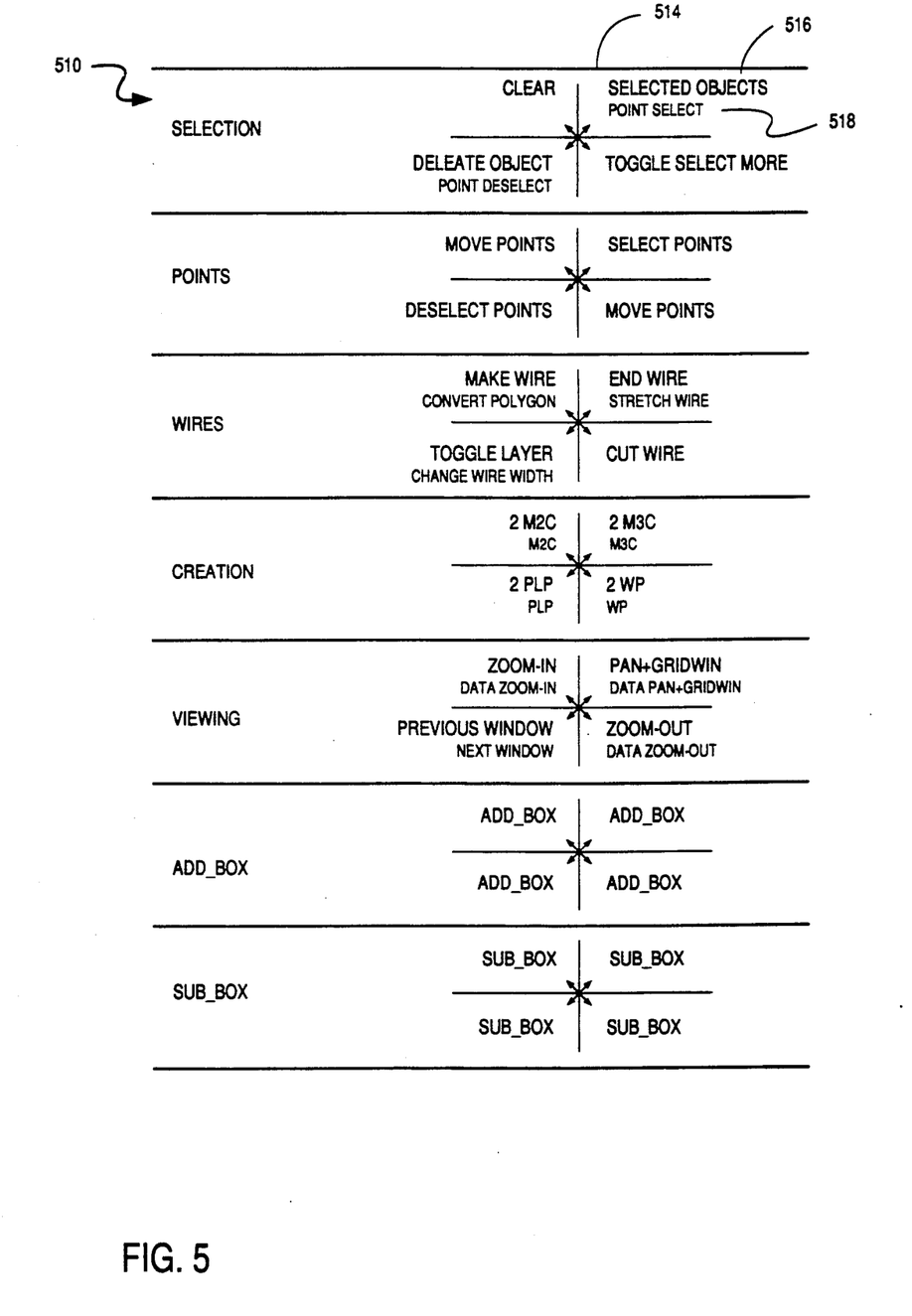
FIG. 5 diagrams the prepackaged groups of commands available in the preferred embodiment.

Referring to FIG. 5, the software shell of the described embodiment provides seven prepackaged macros, or groups of commands for VLSI layout applications, that are interpreted by the command executive of the application. Each macro provides a binding of commands to the set of four quadrants, and the macro, in turn, may be bound to a button. The commands within a macro are related as indicated by the name. For instance, SELECTION bundles commands for selecting individual objects or all the objects in a region, or deselecting all currently-selected objects. CREATION bundles commands for creating features of the design, for instance a 2-metal,2-contact via (2M2C), a poly landing pad (PLP), or a well plug (WP). VIEWING bundles commands for zooming and panning the screen window around to view different parts of the design. Each diagram of FIG. 5 shows the macro's four primary commands in bold italic font; the commands are positioned in the diagram to show the quadrant to which the macro binds the command. For instance, the SELECTION macro 510 provides a northwest command "clear" 514 and a northeast command "select objects" 516. The second function commands are indicated in a non-bold, non-italic font: for instance, the PF2 northeast command for SELECTION is "point select" 518. Often, there is no second function command for one or more quadrants; for instance, SELECTION has neither a northwest nor a southeast second function command.

Figure 6:
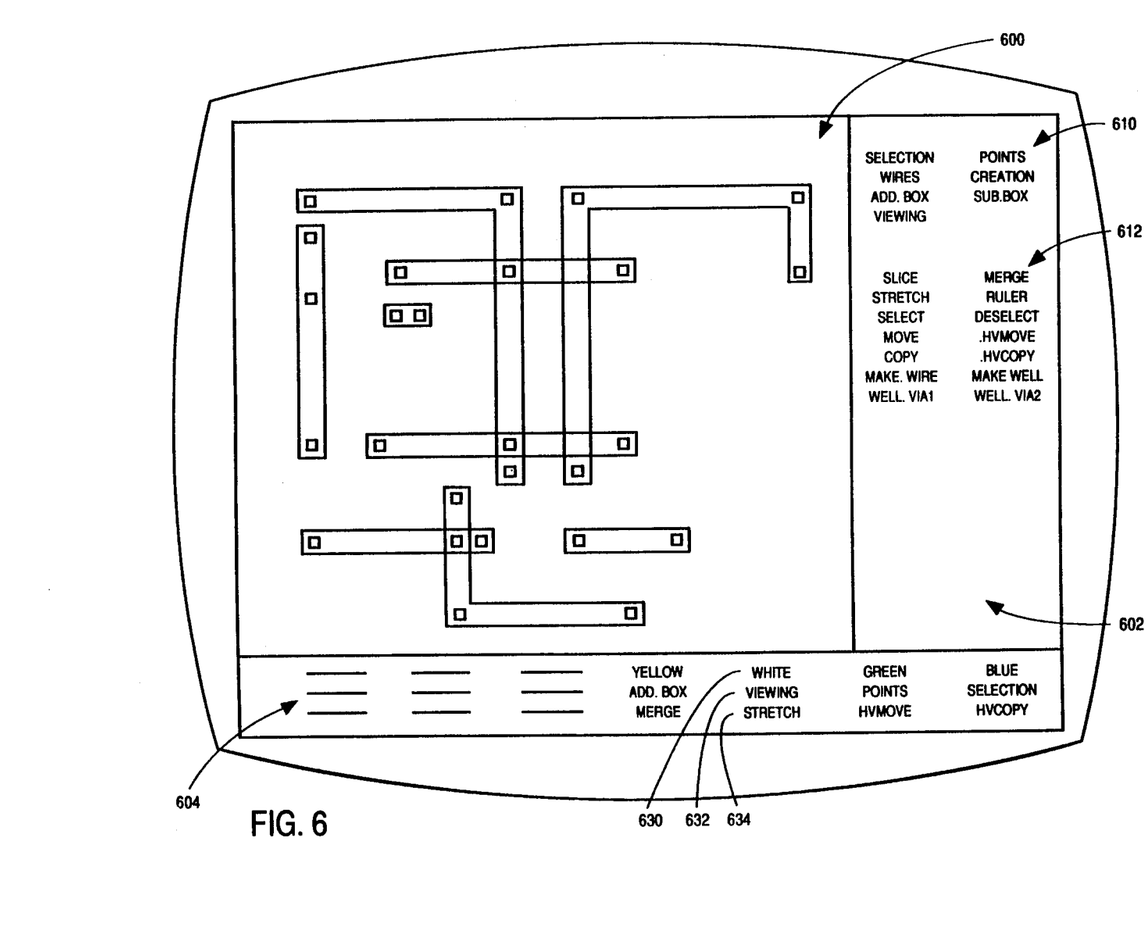
FIG. 6 is a screen display of the VLSI layout program with which the invention can be used.

Referring to FIG. 6, a screen of the VLSI layout tool with which the invention is used is divided into a work area 600, a menu area 602 at the right side, and a status area 604 across the bottom. The software shell allows a user to bind a group of quadrant commands and a point command to each mouse button, and these commands are invoked by clicking in the work area 600. The user binds commands to a button by moving the pointer to a menu item and clicking the button on the menu item. The command menu 602 has two groups of menu items: the prepackaged quadrant macros 610 (SELECTION, POINTS, WIRES, etc.), and point commands 612 (SLICE, MERGE, STRETCH, etc.). When the user clicks on a menu bar for one of the quadrant macros, the commands of the macro are bound to the quadrants of that button. When a user clicks on one of the point commands, that point command is bound to the point command of that button. The current bindings of each of the buttons is displayed in the status area 604. For instance, the white button's 630 quadrants are bound to the VIEWING group of box commands 632, and the white button's point command is bound to STRETCH 634. When the invention is used with a color monitor, the names of the command bindings are displayed in the color of the button to which the commands are bound.

The software shell provides a default binding of the macros of FIG. 5 to buttons and quadrants for a four-button puck. The white button is bound to the VIEWING group, the yellow button to the ADD_BOX group, the green button to the POINTS group, and the blue button to the SELECTION group.

Other embodiments of the invention are within the scope of the following claims. For example, the circle around the first point could be more finely divided. Rather than distinguishing quadrants and points, the system could distinguish quadrants, horizontal and vertical lines, or could distinguish eight octants. Just as "points" had a tolerance neighborhood around them, horizontal or vertical lines could have a tolerance neighborhood. This approach could be extended to the limits of the user's memory and manual dexterity —in an extreme, a unique command could be bound to every degree of a circle. Even though a VLSI designer, the target user, must deal with thousands of transistors, there are a limited number of commands he uses repetitively and intensively. These must be interpreted and executed with high precision, thus the number of divisions of the circle is kept relatively small.

The invention can be used with any pointer device that generates button events. The button events could be successive pairs of full clicks, for instance down/up-drag-northwest-down/up would be distinguished from down/up-drag-southeast-down/up.

The invention could use polar rather than Cartesian coordinates. The commands might then be bound to various segments of the annuli circling the position of the first button event.

More second-function keys could be provided to further increase the number of commands that could be simultaneously bound to a single button.

The re-binding of commands to keys/quadrants could use pop-up menus, or some keyboard-based command language instead of the menu described in FIG. 6.

In FIG. 4, the nested IF constructs of steps 440, 442, 450, 452, . . . 472 (and the test not shown to determine which button was clicked) could be replaced by code similar to the following:

```
switch := 0;
IF( Δx < 0 ) THEN
    switch := switch + 1;
IF( Δy < 0 ) THEN
    switch := switch + 2;
IF( second_function_key_was_pressed ) THEN
    switch := switch + 4;
switch := switch + ( 8 * number_of_button );
CASE switch OF
    0: CALL button_0_northeast_primary_command( );
    1: CALL button_0_northwest_primary_command( );
    ...
    31: CALL button_3_southwest_PF2_command( );
END CASE
```

What is claimed is:

1. A method for generating input commands to a computer running a program, said computer generating a display and including a pointer device for controlling a location of a pointer on said display, said pointer device having a button for generating button events, the method comprising:
   detecting a first button event that occurs at a first location of said pointer;
   detecting a second button event that occurs at a second location of said pointer;
   partitioning a space around said first location into non-overlapping sectors;
   binding to each of at least some of said sectors a corresponding one of a plurality of commands;
   establishing if said second location is within one of the sectors to which a corresponding command is bound; and
   if said second location is within one of the sectors to which a command is bound selecting as a command to submit to said program the command that is bound to the sector in which said second location is located.

2. The method of claim 1 wherein said first and second locations are specified as x and y coordinates, and wherein the step of establishing comprises:
   a) comparing the x coordinate of said second location to the x coordinate of said first location,
   b) comparing the y coordinate of said second location to the y coordinate of said first location, and
   c) using said comparisons to determine whether said second location falls within one of the sectors to which a corresponding command is bound.

3. The method of claim 1 wherein said sectors comprise four quadrants.

4. The method of claim 3 wherein said sectors further comprise a neighborhood defined as locations within a preselected distance of one of the x and y coordinates of the first location.

5. The method of claim 4 wherein said preselected distance is user selected.

6. The method of claim 1 wherein said first and second locations determine opposite corners of a rectangular region of said display, and said command acts on an object enclosed within said rectangular region.

7. The method of claim 1 wherein if the step for establishing determines that the second location is within a sector to which no command is bound, the method further comprises proceeding without submitting any command to said program.

8. The method of claim 7 wherein said display comprises a work area and a region outside said work area, and wherein said region outside said work area is without a bound command.

9. The method of claim 7 wherein said display comprises a menu of groups of commands, and the choosing step comprises the user selecting a group of commands from said menu of groups of commands, wherein the selected group of commands are the commands that are bound to said at least some of said sectors.

10. The method of claim 9 wherein an item of said menu specifies a prepackaged group of commands, each command of said group to be bound respectively to said sectors.

11. The method of claim 1 wherein the binding step comprises a user of the computer choosing the commands that are bound to said at least some of said sectors.

12. The method of claim 1 further comprising checking whether a second function key has been pressed;
   wherein the binding step binds first and second commands to one of said sectors; and
   wherein, if said second location is established to be within said sector to which two commands are bound, the selecting step selects as the command to submit to said program said second command if said second function key has been pressed, else said first command.

13. The method of claim 1 wherein said first button event is a downclick of a button of said pointer device and said second button event is an upclick of said button.

14. The method of claim 1 wherein said pointer device includes multiple buttons and the selecting step further comprises determining which of said buttons were clicked.

15. The method of claim 1 wherein said program comprises electronic design software.

16. A method for generating input commands to a computer running a program, said computer generating a display and including a pointer device for controlling a location of a pointer on said display, said location specified as x and y coordinates, said pointer device having a button for generating button events, the method comprising:
   detecting a first button event that occurs at a first location of said pointer;
   partitioning a space around said first location into non-overlapping sectors, said sectors comprising four quadrants and a neighborhood defined as locations within a preselected distance of one of the x and y coordinates of the first location;
   binding to each of at least some of said sectors a corresponding one of a plurality of commands;
   detecting a second button event that occurs at a second location of said pointer;
   comparing the x coordinate of said second location to the x coordinate of said first location; and
   comparing the y coordinate of said second location to the y coordinate of said first location;
   using said comparison to determine which of said sectors said second location falls within; and
   if said second location is within a sector to which a command is bound, sending the command that is bound to the sector in which said second location is located to said program.

17. Apparatus for generating input commands to a program for execution on a computer, said computer generating a display and including a pointer deice for controlling a location of a pointer on said display, said pointer device having a button for generating button events, the apparatus comprising:
- a device driver for detecting a first button event that occurs at a first location of said pointer and a second button event that occurs at a second location of the pointer;
- means for partitioning of a space around said first location into non-overlapping sectors;
- means for binding to each of at least some of said sectors a corresponding one of a plurality of commands;
- means for categorizing said second location relative to said first location, wherein said categorizing means determines if said second location is within one of the sectors to which a corresponding command is bound; and
- means for selecting a command to submit to said program, said selection depending on the categorization by said categorizing means, wherein, if said second location is within one of the sectors to which a command is bound, said selection means selects as the command to submit to said program the command that is bound to the sector in which said second location is located.

18. The apparatus of claim 17 wherein said sectors comprise four quadrants and a neighborhood defined as locations within a preselected distance of one of the x and y coordinates of the first location.

* * * * *